United States Patent Office 3,200,174
Patented Aug. 10, 1965

3,200,174
COMPOSITIONS CONTAINING BUTYL RUBBER
AND OLEFIN COPOLYMER RUBBER
Stephen Adamek and Edward Allan Dudley, Toronto, Ontario, Canada, assignors to Dunlop Rubber Company Limited, County of London, England, a British company
No Drawing. Filed Mar. 18, 1964, Ser. No. 352,962
Claims priority, application Great Britain, June 8, 1959, 19,599/59
15 Claims. (Cl. 260—889)

This application is a continuation-in-part of our copending application Serial No. 31,844 filed May 26, 1960, now Patent No. 3,136,739 for Synthetic Rubber Compositions.

This invention relates to synthetic rubber compositions and in particular to compositions comprising a high viscosity butyl rubber and a low viscosity olefine copolymer rubber. By "butyl rubber" we mean a copolymer of an iso-mono-olefine, usually isobutylene, with a small proportion, usually less than 5 percent, of a di-olefine such as butadiene and isoprene.

Butyl rubber has the advantage of being cheap and of having a high degree of impermeability to air. On the other hand it is somewhat slow-curing, and also its tensile properties may not be so good as can be desired unless its viscosity is high; such high viscosities, however, reduce processability.

The olefine copolymer rubbers also have this last disadvantage.

It is an object of the present invention to provide rubber compositions which shall be capable of being easily processed yet which shall have tensile properties approaching or equalling those of high viscosity butyl rubber or olefine copolymer rubber, and which shall also be easily cured.

According to the invention a butyl rubber is blended with an olefine copolymer rubber of a broadly similar degree of unsaturation but of very different viscosity, the butyl rubber and the olefine copolymer being in relative proportions between about 70:30 and 40:60, and the relative proportions of the butyl rubber and olefine copolymer rubber being so correlated with their respective viscosities that the blend has a Mooney viscosity of 40-60 (ML-8 at 125° F.). Thus a high viscosity butyl rubber (Mooney viscosity above 65 and preferably above 70, e.g., 70-85) can be blended with a low viscosity olefine copolymer rubber (Mooney viscosity below 40 and preferably below 30, eg., 20-30). Blends containing about equal parts of the two components, say about 45 percent to 55 percent of butyl rubber and the corresponding proportion of the olefine copolymer rubber, are particularly useful. It is remarkable that in the blends of the invention the tensile properties approach or equal those of the high viscosity butyl rubber or olefine copolymer rubber alone, while the blends are considerably more easily processed and have improved tack, especially equipment tack.

As the butyl rubber component it is preferable to use a copolymer of isobutylene (95 percent to 99.5 percent) with 1,3-butadiene and/or isoprene (5 percent to 0.5 percent).

The olefine copolymer rubber may be a copolymer of one or more mono-olefines, preferably containing 2–10 carbon atoms, with a compound containing more than one ethylenic double bond especially a system of conjugated double bonds, which can be, for example butadiene, isoprene or cyclopentadiene, but is preferably an unsaturated endocyclic hydrocarbon containing at least one and preferably two or more ethylenic double bonds. Examples of such hydrocarbons are unsaturated derivatives of bicyclo-(2,2,1)-heptane including norbornene and bicyclopentadiene (1,4-endomethylene-hydrind-2,6-diene); unsaturated derivatives of bicyclo-(2,2,2)-octane including bicyclo-(2,2,2)-octa-2,5-diene; and unsaturated derivatives of bicyclo-(3-2-1)-octane, bicyclo-(3,3,1)-nonane and bicyclo-(3,2,2)-nonane. Further examples of suitable endocyclic hydrocarbons, and instructions for the production of copolymers, will be found in application Serial No. 748,165 filed July 14, 1958. Terpolymers of ethylene, propylene and dicyclopentadiene, especially such as contain 40 percent to 50 percent of propylene and 2 percent to 4 percent unsaturation, are especially useful. (It will, of course, be understood that the term "copolymer" as used in this specification is not restricted to two component systems.)

The precise relationship between the degree of unsaturation of the butyl rubber and that of the olefine copolymer rubber is not important, so long as both are sufficient for effective vulcanisation, said 0.75 percent or above. Generally speaking both may usefully be between 0.75 percent and 4 percent, and will then be regarded as "broadly similar" for the purpose of this specification.

The novel blends of the invention can be cured with sulphur in the usual way, but it has been found that a product having better physical properties is usually obtained by promoting the sulphur cure by addition of a small quantity, e.g., 0.25 percent to 2 percent of one of the known peroxide curing agents, especially dicumyl peroxide. This easy curability of the blends is surprising in view of the fact that it has not heretofore been practicable to con-vulcanise butyl rubber with other rubbers without first modifying it, for example, by halogenation.

The invention is illustrated by the following examples:

Example 1

In this example a blend in accordance with the invention was made and compared with two controls, one of the butyl rubber and one of the olefine copolymer rubber used in the blend. The butyl rubber was a polyisobutylene/isoprene rubber of Mooney viscosity 74 and containing 1.52 percent unsaturation; the olefine copolymer rubber was a terpolymer of ethylene, propylene and dicyclopentadiene containing 42 percent of propylene and 3.0 percent unsaturation and having a Mooney viscosity of 22.

Three compositions were made up as follows:

|  | A | B | C |
|---|---|---|---|
| Butyl Rubber | 100 | 50 |  |
| Olefine copolymer |  | 50 | 100 |
| Furnace Black (HAF black) | 50 | 50 | 50 |
| Zinc Oxide | 5 | 5 | 5 |
| Stearic Acid | 2 | 2 | 2 |

100 parts each of A, B and C were milled with the following curing compositions:

|  | D | E |
|---|---|---|
| Tetramethylthiuram disulphide | 1 | 1 |
| Tellurium diethyl dithiocarbamate | 0.5 | 0.5 |
| Sulphur | 2 | 2 |
| Dicumyl peroxide |  | 1 |

The compounded rubbers were then cured at 320° F. for 30 minutes.

The physical properties of the blend and of the two controls are given in the following table:

| Curing recipe | Butyl Rubber A | | Blend B | | Olefine Copolymer C | |
|---|---|---|---|---|---|---|
| | D | E | D | E | D | E |
| Modulus 300%, p.s.i. | 1,695 | 1,470 | 1,650 | 1,720 | -------- | 1,300 |
| Tensile strength, p.s.i. | 2,245 | 2,325 | 1,920 | 2,220 | 940 | 1,400 |
| Elongation, percent | 410 | 440 | 340 | 400 | 230 | 320 |
| Resilience, percent (tripsometer) | -------- | 36 | -------- | 46 | -------- | 48 |
| Hardness (degrees) | 70–65 | 70–64 | 76–71 | 76–70 | 73–70 | 77–70 |

It will be apparent from the above figures that the inclusion of the low viscosity olefine copolymer rubber in the blends has had comparatively little effect on the tensile properties of the butyl rubber, but has considerably increased its resilience. Moreover the blend was more readily processable and curable than the butyl rubber.

*Example II*

A blend of butyl rubber and an olefine copolymer rubber was made and compared in its properties with the properties of the constituents of the blends when each was compounded and cured, as in Example I. The butyl rubber was a polyisobutylene/isoprane rubber having a Mooney viscosity of 76 and containing 1.52 percent unsaturation; the olefine copolymer rubber was a terpolymer of ethylene, propylene and dicyclopentadiene containing 40 mole percent of propylene and 1.6 mole percent of unsaturation and had a Mooney viscosity of 20. The formulae of the three compositions were as follows:

| | A | B | C |
|---|---|---|---|
| Butyl rubber | 100 | 50 | ------ |
| Olefine copolymer | ------ | 50 | 100 |
| High abrasion furnace black | 50 | 50 | 50 |
| Zinc oxide | 5 | 5 | 5 |
| Stearic acid | 2 | 2 | 2 |
| Tetramethyl thiuram disulphide | 1 | 1 | 1 |
| Tellurium diethyl dithiocarbamate | 0.5 | 0.5 | 0.5 |
| Sulphur | 2 | 2 | 2 |

The above compositions were cured by heating for 30 minutes at 307° F. and the physical properties of the compositions are given in the following table:

| | A | B | C |
|---|---|---|---|
| Modulus, 300% p.s.i. | 1,280 | 1,480 | 1,600 |
| Tensile strength, p.s.i. | 2,520 | 2,520 | 2,440 |
| Elongation at break, percent | 520 | 450 | 450 |
| Hardness (degrees) | 62–58 | 68–63 | 73–68 |

The blend was more easily processable than the high viscosity butyl rubber and yet gave identical tensile strength, and other physical properties were comparable.

*Example III*

A similar comparison to those of Examples I and II was made in which the butyl rubber had a Mooney viscosity of 75 and a molar unsaturation of 2.2 percent: the olefine copolymer rubber was a terpolymer of ethylene, propylene and dicyclopentadiene containing 44 percent of propylene and 2.0 percent unsaturation and having a Mooney viscosity of 27.5.

Three compositions were prepared having the following formulations:

| | A | B | C |
|---|---|---|---|
| Butyl rubber | 100 | 50 | ------ |
| Olefine copolymer | ------ | 50 | 100 |
| High abrasion furnace black | 50 | 50 | 50 |
| Zinc oxide | 5 | 5 | 5 |
| Tetramethyl thiuram disulphide | 1 | 1 | 1 |
| Mercaptobenzthiazole | 0.5 | 0.5 | 0.5 |
| Sulphur | 1 | 1 | 1 |

The compounded rubbers were given a cure of 15 minutes rise and 45 minutes at 320° F. The physical properties of the blend B and the two controls are given in the following table:

| | A | B | C |
|---|---|---|---|
| Modulus 300%, p.s.i. | 2,175 | 1,850 | 1,550 |
| Tensile strength, p.s.i. | 2,715 | 2,590 | 1,975 |
| Elongation at break, percent | 365 | 410 | 370 |
| Resilience at 50° C. percent | 55 | 53 | 48 |
| Hardness, (° B.S.) | 68 | 67 | 59 |

The figures in the above table show that the inclusion of the low viscosity olefine copolymer with the butyl rubber had little effect upon the tensile, hardness or resilience properties of the butyl rubber. The blend was, however, more readily processable than the butyl rubber alone.

*Example IV*

Compositions the same as those of Example III were prepared, except that the ethylene/propylene/dicyclopentadiene terpolymer had a propylene content of only 35 percent, 2.0 percent unsaturation and a Mooney viscosity of 25. The cure of the compositions was the same as for those of Example III and the physical properties of the cured compositions are given in the following table in which A is the butyl rubber composition, B the blend and C the olefine copolymer rubber as for the other examples:

| | A | B | C |
|---|---|---|---|
| Modulus 300%, p.s.i. | 1,890 | 1,750 | 1,550 |
| Tensile strength, p.s.i. | 2,790 | 2,605 | 1,975 |
| Elongation at break, percent | 413 | 420 | 370 |
| Resilience at 50° C. percent | 50 | 50 | 48 |
| Hardness (° B.S.) | 69 | 66 | 59 |

From the figures in the table it will be seen that the advantages in processing by using a blend of the low viscosity terpolymer with the high viscosity butyl rubber were similar to those obtained in Example III.

It should be understood, of course, that the foregoing disclosure relates only to certain preferred embodiments of the invention and that it is intended to cover all changes and modifications of the examples of the invention herein chosen for the purposes of the disclosure, which do not constitute departures from the spirit and scope of the invention.

Having described our invention what we claim is:

1. A blend of an uncured butyl rubber which is a copolymer of an iso-mono-olefine with less than 5 percent of a conjugated diolefine, with an uncured olefine copolymer rubber which is a copolymer of at least one straight chain mono-olefine with a hydrocarbon containing at least two ethylenic double bonds, in which both rubbers have a degree of unsaturation between 0.75 and 4 percent, the relative proportions of the butyl rubber and the olefine copolymer rubber in the blend being between 70:30 and 40:60, the butyl rubber having a Mooney viscosity (ML–8 at 125° F.) above 65 and the olefine copolymer rubber having a Mooney viscosity (ML–8 at 125° F.) below 40, and the relative proportions of the butyl rubber and olefine copolymer rubber being so correlated with their viscosities that the blend has a Mooney viscosity (ML–8 at 125° F.) of 40–60.

2. A blend according to claim 1 wherein the butyl rubber has a Mooney viscosity (ML-8 at 125° F.) of 70-85 and the olefine copolymer rubber has a Mooney viscosity (ML-8 at 125° F.) of 20-30.

3. A blend according to claim 1 wherein the relative proportions of the butyl rubber and the olefine copolymer rubber are between 45:55 and 55:45.

4. A blend according to claim 1 wherein the butyl rubber is a copolymer of isobutylene (95 percent to 99.5 percent) with at least one conjugated diolefine selected from the group which consists of 1,3-butadiene and isoprene (5 percent to 0.5 percent).

5. A blend according to claim 1 wherein the olefine copolymer rubber is a copolymer of at least one microolefine having 2-10 carbon atoms in the molecule with a hydrocarbon containing at least two conjugated ethylenic double bonds.

6. A blend according to claim 5 wherein the said hydrocarbon is an unsaturated endocyclic hydrocarbon.

7. A blend according to claim 1 wherein the olefine copolymer rubber is a copolymer of ethylene, propylene and dicyclopentadiene containing 40 percent to 50 percent of propylene and 2 percent to 4 percent unsaturation.

8. A blend according to claim 1 containing also sulphur as a curing agent.

9. A blend according to claim 8 containing also a peroxide curing agent.

10. A blend according to claim 9 containing 0.25 percent to 2 percent of dicumyl peroxide.

11. A blend of an uncured butyl rubber which is a copolymer of isobutylene (95 percent to 99.5 percent) with at least one conjugated diolefine selected from the group which consists of 1,3-butadiene and isoprene (5 percent to 0.5 percent) with an uncured olefine copolymer rubber which is a copolymer of at least one straight chain mono-olefine having 2-10 carbon atoms in the molecule with a hydrocarbon containing at least two conjugated ethylenic double bonds, in which both rubbers have a degree of unsaturation between 0.75 percent and 4 percent, the relative proportions of the butyl rubber and the olefine copolymer rubber being between 45:55 and 55:45, the butyl rubber having a Mooney viscosity (ML-8 at 125° F.) of 70-85 and the olefine copolymer rubber a Mooney viscosity (ML-8 at 125° F.) of 20-30, and the relative proportions of the butyl rubber and the olefine copolymer rubber being so correlated with their viscosities that the blend has a Mooney viscosity (ML-8 at 125° F.) of 40-60.

12. A blend according to claim 11 wherein the olefine copolymer rubber is a copolymer of ethylene, propylene and dicyclopentadiene containing 40 percent to 50 percent of propylene and 2 percent to 4 percent unsaturation.

13. A blend according to claim 12 containing also sulphur as a curing agent and 0.25 percent to 2 percent of dicumyl peroxide.

14. Process for the production of a cured synthetic rubber, which comprises heating until a cure has been effected as blend as claimed in claim 8.

15. Process for the production of a cured synthetic rubber, which comprises heating until a cure has been effected a blend as claimed in claim 13.

References Cited by the Examiner

UNITED STATES PATENTS 3,136,739   6/64   Adamek et al. _____ 260—889

MURRAY TILLMAN, *Primary Examiner.*